(12) United States Patent
Bachmeier et al.

(10) Patent No.: US 11,634,029 B2
(45) Date of Patent: Apr. 25, 2023

(54) MOTOR VEHICLE

(71) Applicant: Bayerische Motoren Werke Aktiengesellschaft, Munich (DE)

(72) Inventors: Johannes Bachmeier, Munich (DE); Matthias Lindner, Graefelfing (DE); Florian Miedl, Munich (DE); Thomas Tille, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 17/274,491

(22) PCT Filed: Jul. 29, 2019

(86) PCT No.: PCT/EP2019/070367
§ 371 (c)(1),
(2) Date: Mar. 9, 2021

(87) PCT Pub. No.: WO2020/057816
PCT Pub. Date: Mar. 26, 2020

(65) Prior Publication Data
US 2021/0309106 A1 Oct. 7, 2021

(30) Foreign Application Priority Data
Sep. 17, 2018 (DE) ............ 10 2018 215 735.9

(51) Int. Cl.
*B60K 35/00* (2006.01)
*B60Q 3/14* (2017.01)
(Continued)

(52) U.S. Cl.
CPC ............ *B60K 35/00* (2013.01); *B60Q 3/14* (2017.02); *B60Q 3/62* (2017.02); *B60R 13/02* (2013.01);
(Continued)

(58) Field of Classification Search
CPC ............ B60K 35/00; B60K 2370/48; B60K 2370/143; B60K 2370/158;
(Continued)

(56) References Cited

U.S. PATENT DOCUMENTS 6,379,988 B1 * 4/2002 Peterson ............ B81C 1/00333
257/E21.502
10,638,618 B1 * 4/2020 Teil ............ H03K 17/955
(Continued)

FOREIGN PATENT DOCUMENTS

DE 10 2006 056 272 A1 5/2008
DE 10 2014 019 242 A1 6/2016
(Continued)

OTHER PUBLICATIONS

International Search Report (PCT/ISA/210) issued in PCT Application No. PCT/EP2019/070367 dated Oct. 7, 2019 with English translation (five (5) pages).
(Continued)

*Primary Examiner* — Christopher E Leiby
(74) *Attorney, Agent, or Firm* — Crowell & Moring LLP

(57) ABSTRACT

A display device for an interior of a motor vehicle has an opaque decorative layer with a display side and a rear side. The opaque decorative layer has at least one opening which extends through the opaque decorative layer from the rear side as far as the display side and which is filled with a light-guiding filling material. At least one illumination source is arranged in the region of the rear side of the opaque decorative layer in such a way that the illumination source emits light through the opening with the light-guiding filling material from the display side of the opaque decorative layer into the interior.

15 Claims, 1 Drawing Sheet

(51) Int. Cl.
*B60Q 3/62* (2017.01)
*B60R 13/02* (2006.01)
*G06F 3/041* (2006.01)
*G06F 3/044* (2006.01)

(52) U.S. Cl.
CPC ............ *G06F 3/044* (2013.01); *G06F 3/0414* (2013.01); *B60K 2370/143* (2019.05); *B60K 2370/1464* (2019.05); *B60K 2370/152* (2019.05); *B60K 2370/158* (2019.05); *B60K 2370/336* (2019.05); *B60K 2370/48* (2019.05); *B60R 2013/0287* (2013.01); *G06F 2203/04108* (2013.01)

(58) Field of Classification Search
CPC ...... B60K 2370/1464; B60K 2370/152; B60K 2370/336; B60Q 3/14; B60Q 3/62; B60R 13/02; B60R 2013/0287; G06F 3/0414; G06F 3/044; G06F 2203/04108
See application file for complete search history.

(56) References Cited

U.S. PATENT DOCUMENTS

| | | | | |
|---|---|---|---|---|
| 11,208,037 | B2* | 12/2021 | Lisseman | B62D 15/029 |
| 2005/0156483 | A1* | 7/2005 | Steckel | B60K 37/06 |
| | | | | 310/311 |
| 2006/0131159 | A1* | 6/2006 | Kaps | H03K 17/962 |
| | | | | 200/600 |
| 2008/0157605 | A1* | 7/2008 | Bowden | B60K 37/06 |
| | | | | 307/116 |
| 2009/0056183 | A1* | 3/2009 | Reiland | G02B 6/006 |
| | | | | 40/564 |
| 2015/0279523 | A1* | 10/2015 | Oeuvrard | B60K 37/00 |
| | | | | 338/47 |
| 2016/0103541 | A1* | 4/2016 | Andrews | G06F 3/04144 |
| | | | | 345/173 |
| 2016/0320048 | A1* | 11/2016 | Daniels | G09F 19/22 |
| 2016/0363271 | A1* | 12/2016 | Wu | F21K 9/61 |
| 2017/0062153 | A1* | 3/2017 | Ben Abdelaziz | H01H 13/14 |
| 2017/0153743 | A1* | 6/2017 | Kim | G06K 9/00013 |
| 2018/0252856 | A1 | 9/2018 | Penkert et al. | |
| 2019/0384441 | A1* | 12/2019 | Seo | G06F 3/04182 |
| 2020/0039559 | A1* | 2/2020 | Aerts | H03K 17/962 |
| 2020/0331486 | A1* | 10/2020 | Wieczorek | B60N 3/18 |
| 2020/0391475 | A1* | 12/2020 | Weih | B29C 45/14467 |
| 2020/0406817 | A1* | 12/2020 | Lisseman | B60Q 3/80 |
| 2021/0107400 | A1* | 4/2021 | Erler | B60R 13/02 |
| 2021/0232244 | A1* | 7/2021 | Cotte | G06F 3/03547 |
| 2021/0362594 | A1* | 11/2021 | Mohana | G10L 13/047 |

FOREIGN PATENT DOCUMENTS

| | | | |
|---|---|---|---|
| DE | 20 2015 103 830 U1 | 9/2016 | |
| DE | 10 2016 215 763 A1 | 3/2017 | |
| DE | 10 2016 001 979 A1 | 8/2017 | |
| DE | 10 2016 214 806 A1 | 2/2018 | |
| DE | 10 2017 104 398 A1 | 9/2018 | |
| EP | 1 545 002 A2 | 6/2005 | |
| EP | 1 672 797 A2 | 6/2006 | |

OTHER PUBLICATIONS

German-language Written Opinion (PCT/ISA/237) issued in PCT Application No. PCT/EP2019/070367 dated Oct. 7, 2019 (five (5) pages).
German-language Search Report issued in German Application No. 10 2018 215 735.9 dated Aug. 9, 2019 with partial English translation (15 pages).

* cited by examiner

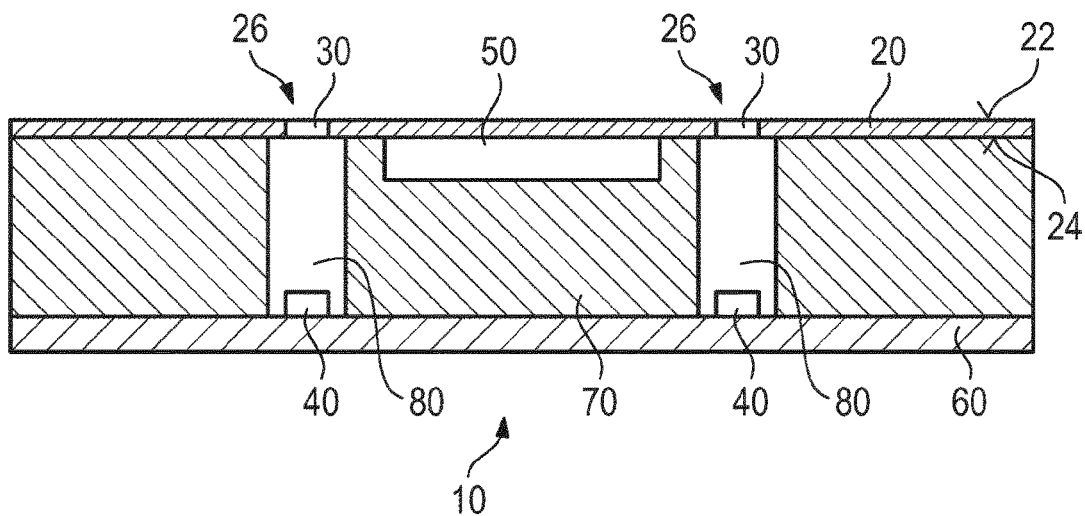
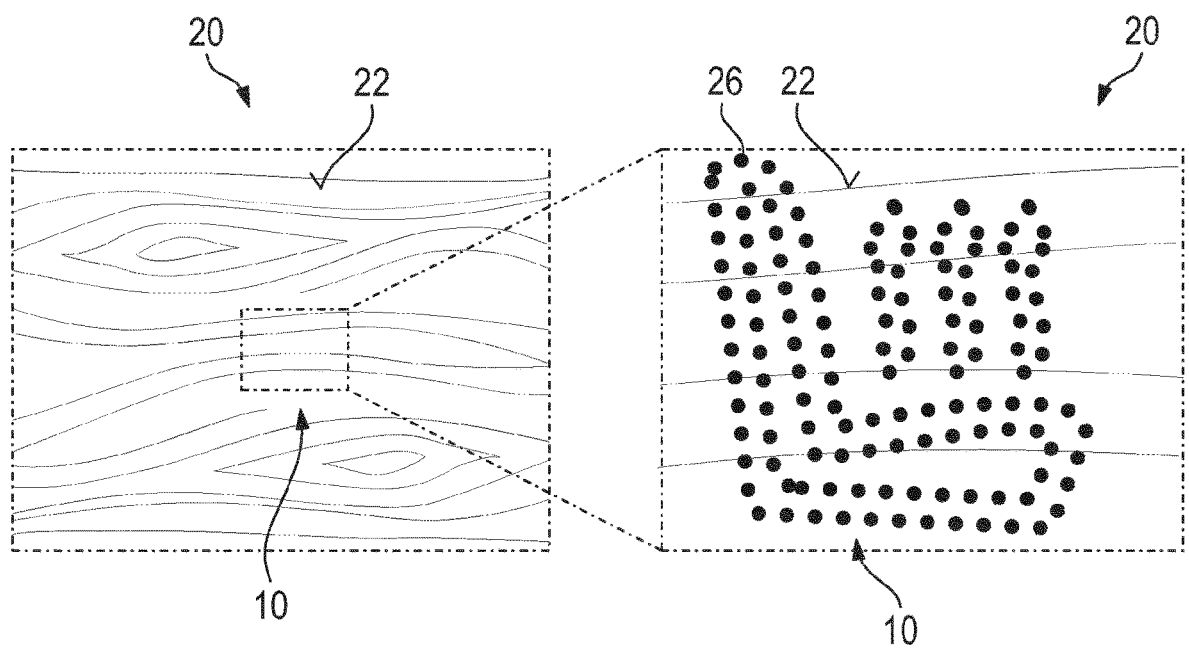

MOTOR VEHICLE

BACKGROUND AND SUMMARY OF THE INVENTION

The invention relates to a display device for an interior of a motor vehicle.

For example, mechanical switches in modular display or operating devices or touch screens as operating devices for an interior of a motor vehicle are known in the prior art. Moreover, display or operating elements with disappearing effect that are integrated in the décor are available only in connection with film technologies, for example in "wood look," "aluminum look," synthetic leather, etc.

It is particularly disadvantageous here that there is a geometric separation of the decorative material and the display or operating element. Furthermore, there are limitations regarding the design. Moreover, the user is overwhelmed by operating possibilities. The display or operating devices are then not made from real decorative material (for example wood, aluminum, etc.) and thus have little intrinsic value. Moreover, known film technologies have the disadvantage that they have poor optical properties, such as a low brightness owing to a poor transmittance of the surface and a high viewing-angle dependence.

It is therefore the object of the invention to provide a display device for an interior of a motor vehicle that is made of a high-quality decorative material, appears only when needed, and is easily visible at many viewing angles.

According to the invention, this object is achieved by a display device for an interior of a motor vehicle, comprising an opaque decorative layer having a display side and a rear side, wherein the opaque decorative layer has at least one opening that extends through the opaque decorative layer from the rear side to the display side and is filled with a light-guiding filling material; and at least one illumination source that is arranged in the region of the rear side of the opaque decorative layer such that the illumination source radiates light through the opening having the light-guiding filling material out of the display side of the opaque decorative layer into the interior.

According to the invention, the unilluminated yet filled opening is not or just barely visible to the human eye, constituting a disappearing effect. When the opening is irradiated by the illumination source, light enters the interior of the motor vehicle and the display device is easily visible to the user. Since the opening is located directly in the decorative material, a seamless interior can be provided, for example a joint-less wood surface. Upon illumination, an opening or symbols of the discrete display elements is visible. Owing to the light-guiding filling material in the opening, the light is guided particularly well to the display side of the decorative layer and out of the display side of the decorative layer. The filling material reduces the viewing-angle dependency of the opening or of the symbols and thus ensures the visibility at various viewing angles. In particular, luminance and contrast are increased. In addition, a visually more homogenous surface is created and thus the disappearing effect when the illumination is not activated is improved compared to an unfilled opening.

An opening within the meaning of the present invention is understood to mean an individual cutout or a hole through the decorative layer. The opening typically has at least a diameter of 0.01 to 1.5 mm, preferably 0.1 to 0.5 mm. According to the invention, with this diameter of the opening, the unilluminated yet filled opening is not or just barely visible to the human eye. The opening can be brought about by various methods (laser, drilling, etc.). The opening can be formed, for example, as a circular-round hole with the abovementioned diameter. Moreover, it is also contemplated that the opening takes the form of a solid line having the abovementioned diameter and a significantly greater length. Other shapes having at least a diameter of 0.01 to 1.5 mm, preferably 0.1 to 0.5 mm, are also contemplated.

In a preferred embodiment, the display device comprises at least one pressure sensor, which is arranged in the region of the rear side of the decorative layer and is designed to capture a push actuation by a user on the display side of the opaque decorative layer. In this way, the display device according to the invention is also embodied in the form of an operating device. In this way, mechanical buttons can be replaced by operating elements with a disappearing effect and high-quality real materials such as wood that are integrated into the décor. Operating devices that are not needed can moreover be obscured depending on the situation. In this way, a tidy and seamless cockpit is created, which gives rise to new design possibilities.

In a further embodiment, the display device comprises at least one capacitive sensor system, which is designed to capture the approach of a body part of a user at the display side of the opaque decorative layer. In this way, the display device according to the invention is also embodied in the form of an operating device.

In a preferred embodiment, the filling material is made of a flowable plastic. In this way, it is particularly easy to introduce the filling material into the opening. With particular preference, the light-guiding filling material is made of polyurethane or of an epoxy resin.

In a further preferred embodiment, the light-guiding filling material contains diffusing particles. The latter homogenize the opening and the represented symbols and further reduce the viewing-angle dependence.

In a preferred embodiment, the pressure sensor comprises at least one piezo element. The piezo element is designed in this case to capture a pressure exerted by the user on the decorative surface. A control signal for controlling a device of the vehicle is preferably generated thereby.

In a preferred embodiment, the piezo element is designed to output, as an actuator, haptic feedback to the user. In this way, the user can be informed about their captured operation of the display device particularly easily and locally. The capturing of the pressure and the feedback can be effected by the same piezo element. However, a plurality of piezo elements can also be used for this purpose.

Furthermore, the decorative surface is designed to bend under the exertion of pressure, so that the pressure sensor can capture the pressure. The decorative surface is furthermore designed to bend in the case of an actuator activity so that haptic feedback is given via the decorative surface.

A further advantage of the display device according to the invention is a low scaling complexity by using piezo elements compared to a solution with global excitation. According to the invention, piezo elements can locally excite the surface, with the result that haptic feedback is triggered only above the piezo element. In this way, each operating element can be equipped with an individual piezo element—if more operating elements are to be contained in one component, the number of piezo elements can be easily added for each operating element. The component and the number of the operating elements can in this way be scaled up with little complexity. For other technologies, by contrast, the surface of the entire décor must be made to vibrate (global excitation) in order to create haptic feedback. In this case, the type of excitation and the exact setting of the active haptics for each component must be set with great complexity and developed from scratch depending on the size and weight of the overall system.

In a preferred embodiment, the piezo element is further designed to trigger, as a switching signal transducer, a function of the motor vehicle. The piezo element can act simultaneously as an actuator for the active haptics and also as a switch. In this way, an additional switching element that is typical of the prior art (e.g. micro switch or snap dome/contact mat) becomes obsolete.

In a particularly preferred embodiment, the decorative layer has a region with a multiplicity of openings. The symbols for the display device can be provided thereby.

The opaque decorative layer is preferably made of wood, plastic, leather, or metal.

According to a further embodiment, a motor vehicle comprises a display device according to the invention.

Embodiments of the invention will be described below with reference to the figures.

BRIEF DESCRIPTION OF THE DRAWINGS

FIG. 1 is a lateral section view of an exemplary display device according to the invention.

FIGS. 2A and 2B show a top view of an exemplary display device according to the invention.

DETAILED DESCRIPTION OF THE DRAWINGS

FIG. 1 shows a display device 10 comprising an opaque decorative layer 20 having a display side 22 and a rear side 24. The display side 22 faces a vehicle interior. The decorative layer 20 is non-transmissive to light and is preferably made from wood, plastic, or metal, in particular aluminum.

The opaque decorative layer 20 has at least one opening 26 that extends through the opaque decorative layer 20 from the rear side 24 to the display side 22 and is filled with a light-guiding filling material 30. According to the invention, the opening 26 has at least a diameter of 0.01 to 1.5 mm, preferably 0.1 to 0.5 mm. The light-guiding filling material 30 can moreover include diffusing particles. The light-guiding material 30 can be applied to the display side 22 or the rear side 24 for example as a flowable plastic and subsequently be removed (for example by way of grinding) therefrom, so that the light-guiding material 30 remains behind only in the opening 26.

At least one illumination source 40 that irradiates the opening 26 is arranged below the decorative layer 20, i.e. in the region of the rear side 24 of the opaque decorative layer 20. In this way, light is radiated by the illumination source 40 through the opening 26 having the light-guiding filling material 30 out of the display side 22 of the opaque decorative layer 20 into the interior. The illumination source 40 can be arranged, for example, on a base structure 60. A carrying structure 70 can be arranged on the base structure 60, and the opaque decorative layer 20 is in turn arranged on the carrying structure 70.

In FIG. 1, for example a pressure sensor 50 is arranged in the carrying structure 70 below the opaque decorative layer 20, i.e. in the region of the rear side 24 of the opaque decorative layer 20. The pressure sensor 50 is here optional. On account of the pressure sensor 50, the display device 10 can also be used as an operating device. The pressure sensor 50 is designed to capture a push actuation by a user on the display side 22 of the opaque decorative layer 20. The display device 10 can also comprise a capacitive sensor system rather than the pressure sensor 50 or in addition to the pressure sensor 50 in order to capture the approach of a body part of a user (not shown). In this way, the display device 10 can also be used as an operating device. The capacitive sensor system can be embodied, for example, in the form of a sensor film. Since the opening 26 is filled with the light-guiding material 30, the advantages according to the invention mentioned above are obtained.

Moreover, it is possible to arrange the illumination source 40 in a cavity 80. The cavity 80 can preferably also be filled with the light-guiding material 30.

FIG. 1 shows that the illumination sources 40 are arranged in each case below one of the openings 26. It is also conceivable here that one illumination source 40 irradiates a plurality of openings 26 at the same time.

FIG. 2A shows a top view of an opaque decorative layer 20, in which the non-irradiated openings 26 are not visible to the naked eye at typical distances in the vehicle interior. FIG. 2B shows an enlarged section of FIG. 2A. This enlargement depicts symbols, represented by a plurality of openings 26 (such as the vehicle seat). In FIG. 2B, an opening 26 is embodied for example as a circular-round hole or as a micro perforation. Other shapes for the opening(s) 26 are also conceivable, however.

Moreover, the display device 10 according to the invention can also comprise a proximity sensor (not shown) that activates the illumination source 40 when a body part (such as a finger) of a user approaches.

LIST OF REFERENCE SIGNS

10 Display device
20 Decorative layer
22 Display side
24 Rear side
26 Opening
30 Light-guiding filling material
40 Illumination source
50 Pressure sensor
60 Base structure
70 Carrying structure.

What is claimed is:

1. A display device for an interior of a motor vehicle, comprising:
   an opaque decorative layer having a display side and a rear side, wherein the opaque decorative layer has at least one opening that extends through the opaque decorative layer from the rear side to the display side and is filled with a light-guiding filling material; and
   at least one illumination source that is arranged in a region of the rear side of the opaque decorative layer such that the illumination source radiates light through the opening having the light-guiding filling material out of the display side of the opaque decorative layer into the interior,
   wherein the light-guiding filling material contains diffusing particles.

2. The display device according to claim 1, further comprising:
   at least one pressure sensor which is arranged in the region of the rear side of the decorative layer and is configured to capture a push actuation by a user on the display side of the opaque decorative layer.

3. The display device according to claim 2, further comprising:
   at least one capacitive sensor system which is configured to capture an approach of a body part of a user at the display side of the opaque decorative layer.

4. The display device according to claim 1, further comprising:
   at least one capacitive sensor system which is configured to capture an approach of a body part of a user at the display side of the opaque decorative layer.

5. The display device according to claim 1, wherein the light-guiding filling material is made of a flowable plastic.

6. The display device according to claim 1, wherein the light-guiding filling material is made of polyurethane or of an epoxy resin.

7. The display device according to claim 2, wherein the pressure sensor comprises at least one piezo element.

8. The display device according to claim 7, wherein the piezo element is configured to output, as an actuator, haptic feedback to the user.

9. The display device according to claim 8, wherein the piezo element is further configured to trigger, as a switching signal transducer, a function of the motor vehicle.

10. The display device according to claim 7, wherein the piezo element is further configured to trigger, as a switching signal transducer, a function of the motor vehicle.

11. The display device according to claim 1, wherein the opaque decorative layer has a region with a plurality of openings.

12. The display device according to claim 1, wherein the opaque decorative layer is made of wood, plastic, leather, or metal.

13. The display device according to claim 1, wherein the opening has at least a diameter of 0.01 to 1.5 mm.

14. The display device according to claim 1, wherein the opening has at least a diameter of 0.1 to 0.5 mm.

15. A motor vehicle comprising a display device according to claim 1.

\* \* \* \* \*